A. L. DAY.
CLUTCH TRIP ACTUATING DEVICE.
APPLICATION FILED OCT. 26, 1912.

1,103,570.

Patented July 14, 1914.
2 SHEETS—SHEET 1.

Witnesses:
Charles G. Cooke.
Mabel Reynolds.

Inventor
Alfred L. Day
by James Coddington Ames Seibold
Attys.

A. L. DAY.
CLUTCH TRIP ACTUATING DEVICE.
APPLICATION FILED OCT. 26, 1912.
1,103,570.
Patented July 14, 1914.
2 SHEETS—SHEET 2.
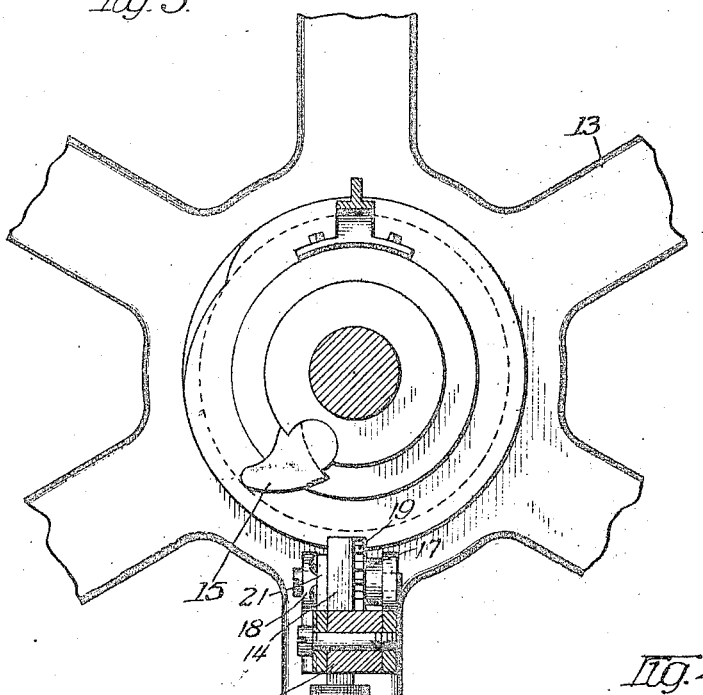
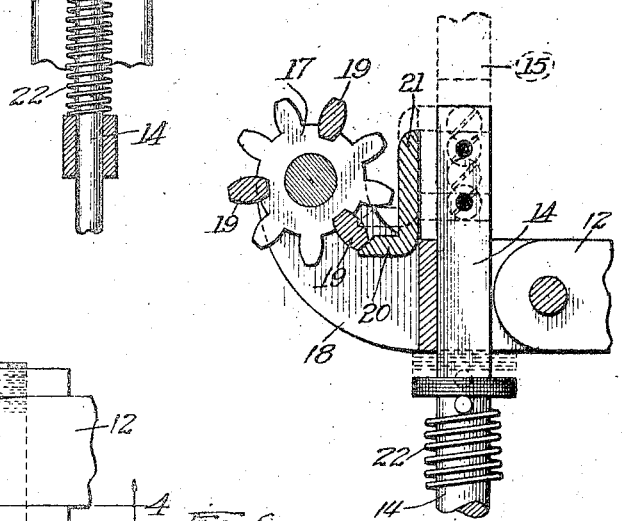
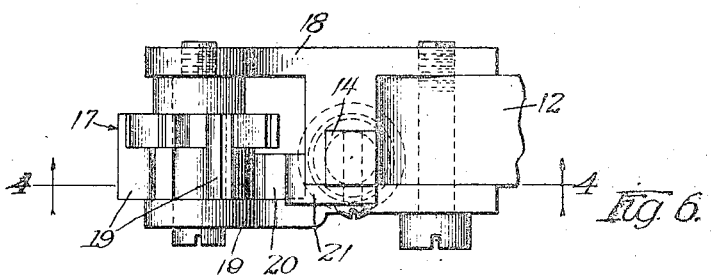
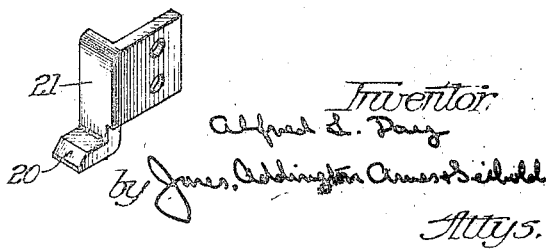

UNITED STATES PATENT OFFICE.

ALFRED L. DAY, OF CHICAGO, ILLINOIS, ASSIGNOR TO AMERICAN PERFORATOR COMPANY, OF CHICAGO, ILLINOIS, A CORPORATION OF ILLINOIS.

CLUTCH-TRIP-ACTUATING DEVICE.

1,103,570.  Specification of Letters Patent.  Patented July 14, 1914.

Application filed October 26, 1912.  Serial No. 727,991.

*To all whom it may concern:*

Be it known that I, ALFRED L. DAY, a citizen of the United States, residing at Chicago, in the county of Cook and State of Illinois, have invented new and useful Improvements in Clutch-Trip-Actuating Devices, of which the following is a full, clear, concise, and exact description, reference being had to the accompanying drawing, forming a part of this specification.

My invention pertains to clutch-trip-actuating devices, and relates particularly to devices for intermittently tripping the clutches of punch presses.

In some kinds of perforating machines, for example, the perforator head is actuated by an eccentric carried by a shaft which is driven from a continuously rotating shaft whenever a clutch between the two shafts is tripped. One of the most common methods of tripping this clutch is by means of a foot lever actuated by the operator. In order to obtain the best results, however, as to speed in operating the machine, it is desirable that means be provided for tripping the clutch automatically at intermittent periods. In my copending application Serial No. 662,297, filed November 25th, 1911, I have described one method of effecting this result.

It is an object of the present invention to provide another manner of intermittently tripping clutches; and it is a further object to provide a simple device, which will be certain in its operation for tripping the clutch of a perforating machine at predetermined intervals.

A device embodying my invention is described, by way of example, in connection with a perforating machine similar to that described in my copending application above referred to, in the following specification and shown in the accompanying drawings. It is to be understood, however, that changes may be made in the device described within the scope of the invention as defined in the appended claims.

Figure 1:
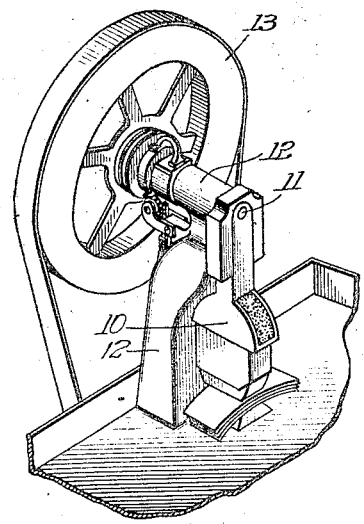
Figure 2:
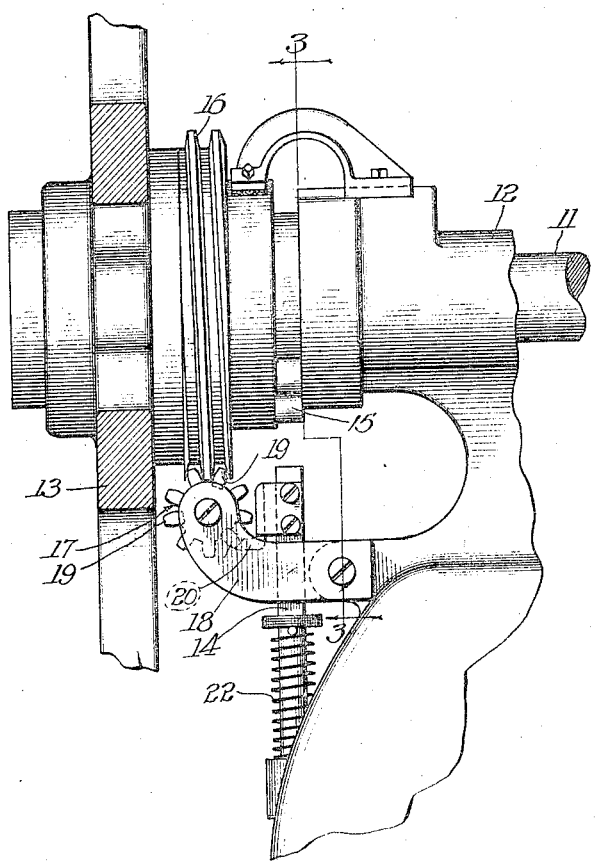

In the drawings: Figure 1 is a perspective view of a portion of a perforating machine equipped with a clutch-trip-actuating device according to my invention; Fig. 2 is a side elevation of the clutch-trip-actuating device; Fig. 3 is an end view of the same; Fig. 4 is an enlarged sectional view, on the line 4—4 of Fig. 5, showing the tripping plunger and the cam pinion for periodically depressing the same; Fig. 5 is a plan of the same parts; and Fig. 6 is a detail view of the bracket for engagement by the cam pinion.

Like reference characters refer to like parts throughout the following specification and the several figures of the accompanying drawings.

Referring now particularly to Fig. 1, 10 designates the perforator head, which is periodically actuated by an eccentric carried by a shaft 11 mounted to rotate in a bearing head 12. A continuously rotating fly wheel 13 is mounted coaxially with the shaft 11 and is connected with the latter through the intermediary of a clutch which is thrown into connecting condition whenever a plunger 14 is depressed out of the path of a clutch operating trigger 15. The construction so far described is well known in the art, the plunger 14 being usually depressed by the operator, by means of a pedal or the like. When the plunger is actuated by the operator, it is possible that he hold it down long enough for the perforator head to be depressed two or more times, it being understood that the plunger must be returned to its elevated position, to engage the trigger 15, before the clutch will be thrown out. To avoid this, as well as to provide for a higher operating speed, I have devised means for depressing the plunger 14 automatically at intervals.

To the above described end, I provide the fly wheel hub with a worm 16 which meshes with a cam pinion 17 carried by a bracket 18 secured to the under part of the bearing head adjacent the fly wheel. The gearing of the worm and pinion is such that the pinion will make one third of a revolution for every three revolutions of the fly wheel. The cam pinion 17 has three equally spaced cam pins 19 projecting laterally therefrom. These cam pins successively engage, from above, a tooth 20 extending outward from a bracket 21 secured to the plunger 14. As each cam pin 19 strikes, during the rotation of the pinion 17, the tooth 20, the plunger 14 will be depressed, thus tripping the clutch and causing the perforator head to operate. As each cam pin passes beyond the tooth 20, the plunger is caused to snap upward, by means of a spring 22, provided for that purpose.

It will be seen from the above that the perforator head is automatically caused to operate once for every three revolutions of the fly wheel, and there is no possibility of the head being operated twice without a pause. Of course, the ratio between the worm 16 and the cam pins 19 may be varied as desired, and, if necessary, the machine may be supplied with a plurality of cam pinions, each having a different number of cam pins, to provide for different speeds of operation.

Having thus described my invention, what I claim as new and desire to secure by Letters Patent, is:

1. The combination with a driving member, a driven member, and a clutch between said members, of a tripper for said clutch, and a worm rotating with said driving member and meshing with an intermittently tripper operating pinion.

2. The combination with a driving member, a driven member, a clutch between said members and means for tripping said clutch, of a cam pinion having a projection thereon adapted to actuate said tripping means, and a worm carried by said driving member and meshing with said pinion to rotate the same.

3. The combination with a driving member, a driven member and a clutch between said members, of a plunger adapted, when operated, to trip said clutch, a cam having a projection adapted to engage and operate said plunger, and gearing between said cam and said driving member.

4. The combination with a driving member, a driven member, and a clutch between said members, of a plunger adapted when operated to trip said clutch, a cam pinion having a projection thereon adapted to engage said plunger and operate the same, and a worm operated by said driving means and meshing with said pinion to rotate the same.

5. The combination with a driving member, a driven member, and a clutch between said members, of a plunger adapted when operated to trip said clutch, a projection on said plunger lying in the path of a projection carried by a pinion, and a worm carried and operated by said driving member meshing with said pinion.

6. The combination with a driving member, a driven member, and a clutch between said members, a pinion meshing with a worm operated by said driving means, one of the teeth of said pinion extending beyond the path of said worm, and a plunger, adapted when operated to trip said clutch, lying in the path of said tooth extension and operated thereby.

In witness whereof, I have hereunto subscribed my name in the presence of two witnesses.

ALFRED L. DAY.

Witnesses:
CHARLES G. COPE,
MABEL REYNOLDS.